US012391128B2

(12) United States Patent
Kim

(10) Patent No.: US 12,391,128 B2
(45) Date of Patent: Aug. 19, 2025

(54) APPARATUS, METHOD, AND COMPUTER-READABLE STORAGE MEDIUM FOR TRANSMITTING AND RECEIVING POWER WIRELESSLY FOR PERSONAL MOBILITY HAVING REPLACEABLE MODULE

(71) Applicants: Hyundai Motor Company, Seoul (KR); Kia Corporation, Seoul (KR)

(72) Inventor: Do Kon Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/330,889

(22) Filed: Jun. 7, 2023

(65) Prior Publication Data

US 2024/0270088 A1 Aug. 15, 2024

(30) Foreign Application Priority Data

Feb. 15, 2023 (KR) ........................ 10-2023-0020283

(51) Int. Cl.
*H02J 50/12* (2016.01)
*B60K 1/04* (2019.01)
*B60L 15/20* (2006.01)
*B60L 50/60* (2019.01)
(Continued)

(52) U.S. Cl.
CPC ............ *B60L 15/2045* (2013.01); *B60K 1/04* (2013.01); *B60L 50/66* (2019.02); *B62D 63/062* (2013.01); *H02J 50/12* (2016.02); *B60K 2001/0438* (2013.01); *B60L 2200/20* (2013.01); *B60L 2200/24* (2013.01); *B60L 2210/10* (2013.01); *B60L 2210/30* (2013.01); (Continued)

(58) Field of Classification Search
None
See application file for complete search history.

(56) References Cited

U.S. PATENT DOCUMENTS 6,265,851 B1 * 7/2001 Brien ................ B60L 50/40
320/137
8,240,748 B2 8/2012 Chapman
10,668,926 B2 6/2020 Birnschein et al.
(Continued)

FOREIGN PATENT DOCUMENTS

JP 2002206254 A 7/2002
JP 6274695 B2 2/2018
KR 102336410 B1 12/2021

*Primary Examiner* — Daniel Kessie
(74) *Attorney, Agent, or Firm* — Slater Matsil, LLP

(57) ABSTRACT

An embodiment apparatus for wirelessly transmitting and receiving power for a personal mobility device having a replaceable module includes a power transmitter; a processor and a non-transitory computer-readable storage medium having recorded thereon one or more programs executable by the processor, wherein the one or more programs include instructions for implementing an identification unit configured to identify an upper module coupled to a base frame, and a power setting unit configured to set a maximum power to be wirelessly transmitted to the identified upper module, wherein the maximum power is set depending on the upper module, wherein the power transmitter is configured to wirelessly transmitt power to the identified upper module within the set maximum power.

20 Claims, 4 Drawing Sheets

(51) Int. Cl.
    *B62D 63/06*     (2006.01)
    *B62B 5/00*     (2006.01)

(52) U.S. Cl.
    CPC ....... *B60L 2210/42* (2013.01); *B60L 2240/42* (2013.01); *B62B 5/0053* (2013.01); *B62B 5/0073* (2013.01)

(56) References Cited

U.S. PATENT DOCUMENTS

| | | |
|---|---|---|
| 2017/0063162 A1* | 3/2017 | Nishikawa .............. H02J 50/12 |
| 2021/0138887 A1 | 5/2021 | Shih et al. |
| 2021/0331749 A1 | 10/2021 | Hwang et al. |

* cited by examiner

APPARATUS, METHOD, AND COMPUTER-READABLE STORAGE MEDIUM FOR TRANSMITTING AND RECEIVING POWER WIRELESSLY FOR PERSONAL MOBILITY HAVING REPLACEABLE MODULE

CROSS-REFERENCE TO RELATED APPLICATIONS

This application claims the benefit of Korean Patent Application No. 10-2023-0020283, filed on Feb. 15, 2023, which application is hereby incorporated herein by reference.

TECHNICAL FIELD

The present disclosure relates to an apparatus, a method, and a computer-readable storage medium for wirelessly transmitting and receiving power for a personal mobility device having a replaceable module.

BACKGROUND

Recently, personal mobility device products capable of coupling various upper modules to one base frame have been researched. For example, an upper module of a stroller, an upper module of an electric car for children, an upper module of a wagon for children, and the like may be coupled to the base frame. In generally, loads of respective upper modules may be different from each other.

For example, in the case of an upper module of an electric car for children, a load such as a brake light, a horn, or a daytime running light may be used. In the case of a stroller or a wagon for children, a load such as a mobile phone charging module or a stationary fan may be used.

In general, power used for a load used in an upper module is supplied from a battery within a base module via a power cable. Therefore, it is not easy to attach or detach the upper module to or from the base frame due to a power cable.

In addition, power is supplied without considering the load used in the upper module, and thus a travel distance per charge of a personal mobility device may be shortened.

SUMMARY

An embodiment of the present disclosure provides an apparatus, method, and computer-readable storage medium for wirelessly transmitting and receiving power for a personal mobility device having a replaceable module capable of allowing an upper module to be easily attached to or detached from a base frame due to a power cable not being required.

Another embodiment of the present disclosure provides an apparatus, method, and computer-readable storage medium for wirelessly transmitting and receiving power for a personal mobility device having a replaceable module capable of optimizing a travel distance per charge of the personal mobility device, and resolving an issue associated with a travel distance of the personal mobility device being shortened when a user is riding on a trailer fastened to a base frame.

According to an embodiment of the present disclosure, there is provided an apparatus for wirelessly transmitting and receiving power for a personal mobility device having a replaceable module, the apparatus including a power transmitter, a processor and a storage medium recording one or more programs configured to be executable by the processor. The one or more programs include instructions for implementing an identification unit configured to identify an upper module coupled to a base frame and a power setting unit configured to set a maximum power to be wirelessly transmitted to the identified upper module, wherein the power transmitter is configured to wirelessly transmit power to the identified upper module within the set maximum power. The maximum power may be set depending on the upper module.

According to another embodiment of the present disclosure, there is provided a method for wirelessly transmitting and receiving power for a personal mobility device having a replaceable module, the method including a first operation of identifying, by an identification unit, an upper module coupled to a base frame, a second operation of setting, by a power setting unit, a maximum power to be wirelessly transmitted to the identified upper module, and a third operation of wirelessly transmitting, by a power transmitter, power to the identified upper module within the set maximum power. The maximum power may be set depending on the upper module.

According to another embodiment of the present disclosure, there is provided a computer-readable storage medium recording a program for executing the method on a computer.

According to an example embodiment of the present disclosure, power may be wirelessly transmitted to an upper module coupled to a base frame, such that the upper module may also use the power of the base frame without any manipulation. A power cable may not be required, such that the upper module may be easily attached to or detached from the base frame.

In addition, according to an example embodiment of the present disclosure, a maximum power transmitted to the upper module may be set depending on the upper module, thereby optimizing a travel distance per charge of a personal mobility device.

In addition, according to an example embodiment of the present disclosure, when a user is riding on a trailer fastened to the base frame, a maximum power to be transmitted to the upper module may be subtracted and transmitted, thereby resolving the issue associated with a travel distance of the personal mobility device being shortened.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

Figure 1:
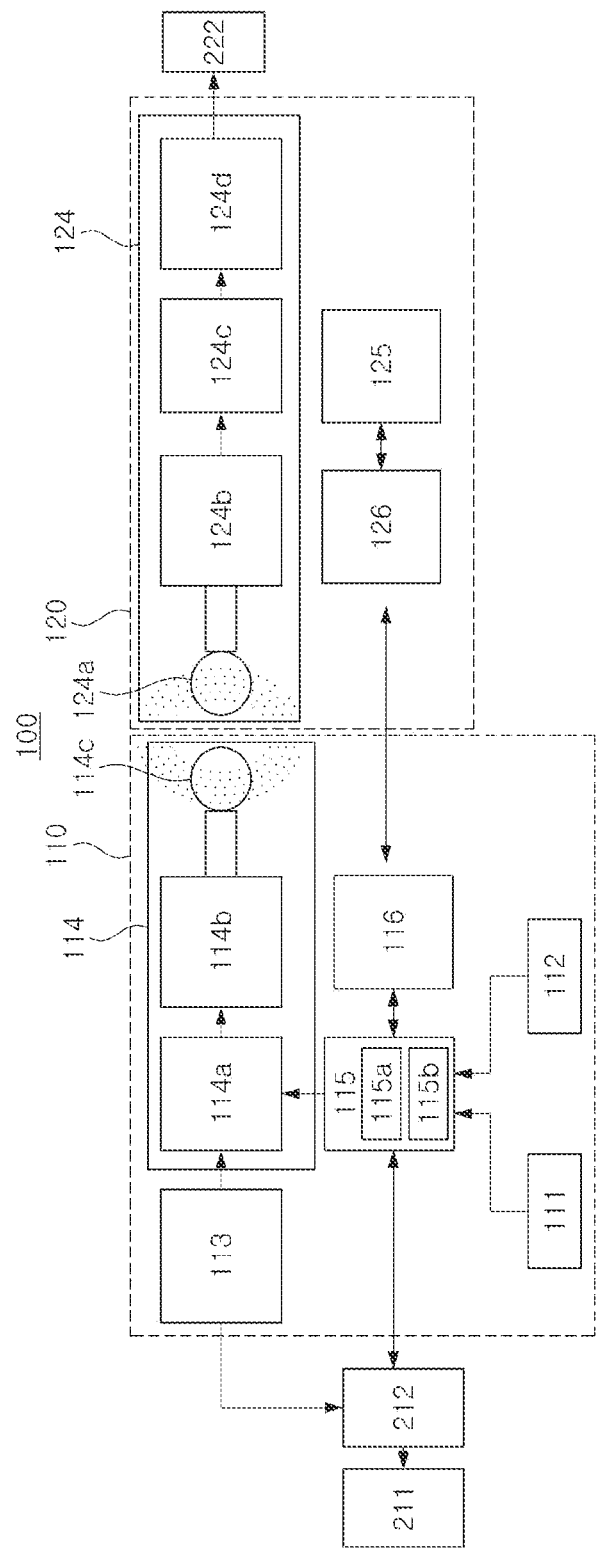
FIG. 1 is a diagram illustrating an apparatus for wirelessly transmitting and receiving power for a personal mobility device having a replaceable module according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. The shapes and sizes of the elements in the drawings may be exaggerated for clarity of description, and the elements denoted by the same reference numerals in the drawings may be the same elements.

Figure 2:
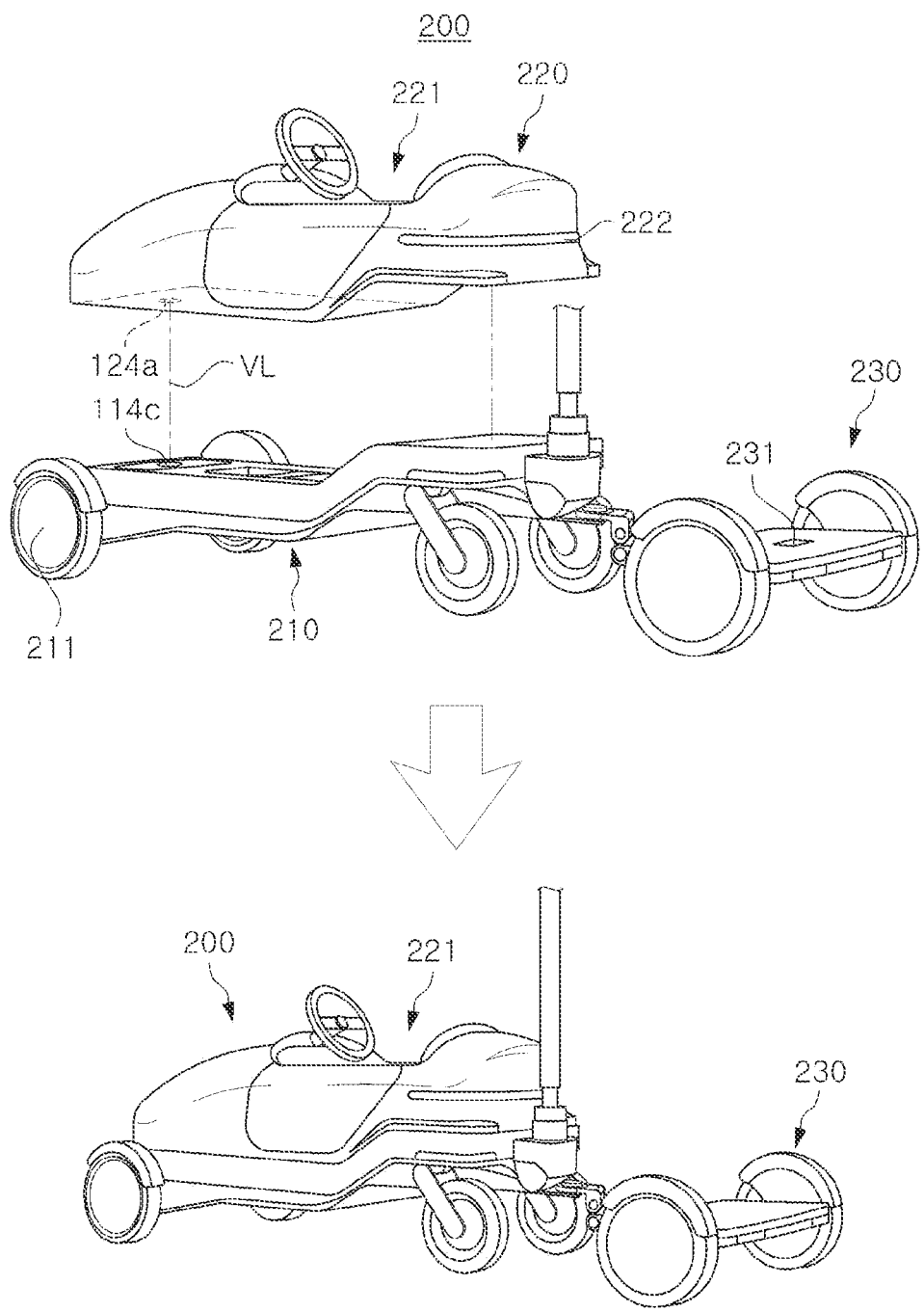
FIG. 2 is an exemplary diagram illustrating a personal mobility device having a replaceable module including a base frame and an upper module attachable to and detachable from the base frame according to an example embodiment of the present disclosure.

FIG. 1 is a diagram illustrating an apparatus for wirelessly transmitting and receiving power for a personal mobility device having a replaceable module according to an example embodiment of the present disclosure. FIG. 2 is an exemplary diagram illustrating a personal mobility device having a replaceable module including a base frame and an upper module attachable to and detachable from the base frame according to an example embodiment of the present disclosure.

In embodiments of the present disclosure, a personal mobility device 200 having a replaceable module may refer to a means of transportation powered by electricity. As illustrated in FIG. 2, the personal mobility device 200 may include a base frame 210 and an upper module 220 attachable to or detachable from the base frame 210. In some example embodiments, the personal mobility device 200 may further include a trailer 230 that may be fastened to the base frame 210.

The base frame 210 described above may move via a driving wheel 211 and may have an upper portion to which an upper module 220 may be coupled. The base frame 210 may include a wireless power transmission apparatus 110 (to be described below) for wirelessly transmitting power stored in a battery. In addition, a transmission resonance coil 114c of the wireless power transmission apparatus 110 may be provided on an upper surface of the base frame 210.

In addition, the upper module 220 may be coupled to an upper portion of the base frame 210 and may include a wireless power reception apparatus 120 (to be described below) for receiving power wirelessly transmitted from the wireless power transmission apparatus 110 described above. In addition, a reception resonance coil 124a of the wireless power reception apparatus 120 may be provided on a lower surface of the upper module 220.

The upper module 220 may be, for example, an upper frame of an electric car for children, as illustrated in FIG. 2. In addition, it may be obvious to those skilled in the art that various upper modules such as an upper frame of a stroller, an upper frame of a wagon for children, and the like may be used, when the upper modules are attachable to or detachable from the base frame 210.

A space 221 in which a user of a preset age or younger rides or cargo is loaded may be formed in an upper portion of the upper module 220 described above.

In a state in which the upper module 220 is coupled to the base frame 210, the transmission resonance coil 114c and the reception resonance coil 124a may be spaced apart from each other by a predetermined interval. In addition, in a state in which the upper module 220 is coupled to the base frame 210, a central portion of the transmission resonance coil 114c and a central portion of the reception resonance coil 124a may be aligned with each other in an upward direction.

Here, being aligned with each other means that the central portion of the transmission resonance coil 114c and the central portion of the reception resonance coil 124a are present on a straight line VL in the upward direction. Such a structure may maximize power transmission efficiency.

In addition, the trailer 230 may be further coupled to the base frame 210 described above. The user may ride on an upper portion of the trailer 230 described above and may include a weight measurement sensor 231 for measuring a weight of the user. The weight of the user measured by the weight measurement sensor 231 may be transmitted to the wireless power transmission apparatus 110 in a wired or wireless manner.

Referring back to FIG. 1, a wireless power transmission/reception apparatus 100 for a personal mobility device having a replaceable module according to an example embodiment may include the wireless power transmission apparatus 110 and the wireless power reception apparatus 120. For ease, FIG. 1 illustrates loads 211, 212, and 222 connected to the wireless power transmission/reception apparatus 100 in addition to the wireless power transmission/reception apparatus 100.

The wireless power transmission apparatus 110 may include a switch 111, a storage unit, i.e., a memory, 112, a battery 113, a power transmitter 114, a controller 115, and a communication unit 116. The base frame 210 may include a driving wheel 211 and a driving motor 212.

Specifically, the switch 111 may be, for example, a switch such as an ignition key. An ON signal of the switch 111 described above may be transmitted to the controller 115 to be described below.

The storage unit 112 may be a module for storing various programs for implementing functions performed by the controller 115 described above. In addition, a maximum power for each upper module may be pre-stored in the storage unit 112, as indicated in Table 1 below.

As indicated in Table 1 below, the above-described maximum power may be different for each upper module, and the maximum power for each upper module may be proportional to a total power of a load used in a corresponding upper module (for example, the number of supportable applications). Therefore, the more loads that are used in the upper module, that is, the more brake lights, mobile phone charging modules, horns, and stationary fans that are attached, the higher a wireless power transmission level, and thus the maximum power may increase.

TABLE 1

| UPPER MODULE | WIRELESS POWER TRANSMISSION LEVEL | MAXIMUM POWER | THE NUMBER OF SUPPORTABLE APPLICATIONS | NOTES |
|---|---|---|---|---|
| UPPER MODULE 1 | LEVEL 1 | 10 W | 1 | ADJUST MAXIMUM POWER WHEN A USER IS RIDING ON A TRAILER |
| UPPER MODULE 2 | LEVEL 2 | 35 W | 3 | |
| UPPER MODULE 3 | LEVEL 3 | 50 W | 5 | |
| UPPER MODULE 4 | LEVEL 4 | 70 W | 7 | |
| UPPER MODULE 5 | LEVEL 5 | 120 W | 10 | |

When an upper module coupled to the base frame 210 is identified, the controller 115 may refer to the storage unit 112 to set a maximum power of the identified upper module. For example, when the identified upper module is Upper Module 3, a maximum power of 50 W may be set as the maximum power, and power may be wirelessly transmitted to the upper module within the set maximum power.

The battery 113 may provide power to the driving motor 212 and the power transmitter 114.

The power transmitter 114 may wirelessly transmit, to the identified upper module, power stored in the battery 113 within the set maximum power.

The power transmitter 114 may include a DC-AC converter 114a converting a DC voltage stored in the battery 113 into an AC voltage and the transmission resonance coil 114c wirelessly transmitting power by the converted AC voltage using a preset wireless power transmission method. In some example embodiments, the power transmitter 114 may further include a matching network 114b for impedance matching. The above-described wireless power transmission method may include, for example, a magnetic induction method or a magnetic resonance method.

The controller 115 may include an identification unit 115a and a power setting unit 115b.

Specifically, when identification information is transmitted from the communication unit 116 to be described below, the identification unit 115a may identify the upper module coupled to the base frame 210 with reference to the storage unit 112. The above-described identification information may be information for distinguishing upper modules from each other, and may be, for example, in the form of Upper Module 1, Upper Module 2, Upper Module 3, Upper Module 4, and Upper Module 5 indicated in Table 1 above. However, it should be noted that, when the upper modules are distinguishable from each other, the form of the identification information is not limited to the above-described form.

The power setting unit 115b may set a maximum power to be wirelessly transmitted to the identified upper module with reference to the storage unit 112. Thereafter, the power transmitter 114 may wirelessly transmit, to the identified upper module, the power stored in the battery 113 within the set maximum power.

In addition, according to an example embodiment of the present disclosure, the power setting unit 115b may determine whether the user is riding on the trailer 230. As a result of the determination, when the user is riding on the trailer 230, the power setting unit 115b may adjust the set maximum power.

Specifically, the power setting unit 115b may determine, based on at least one of a weight measured by the weight measurement sensor 231 and an output of the driving motor 212, whether the user is riding on the trailer 230. Accordingly, when the weight measured by the weight measurement sensor 231 is a preset weight, for example, 40 kg or more, it may be determined that the user is riding on the trailer 230. Alternatively, when the output of the driving motor 212 is a preset output, for example, 50 W or more, it may be determined that the user is riding on the trailer 230. Alternatively, when the weight measured by the weight measurement sensor 231 is 40 kg or more and the output of the driving motor 212 is 50 W or more, it may be determined that the user is riding on the trailer 230.

Thereafter, when it is determined that the user is riding on the trailer 230, the power setting unit 115b may subtract a power having a preset magnitude from the maximum power set above. The power having a preset magnitude may be, for example, 5 W, but the above-described specific numerical value may be changed depending on the needs of those skilled in the art.

According to another example embodiment of the present disclosure, when it is determined that a user is riding on the trailer 230, the power setting unit 115b may subtract power associated with the weight of the user from the maximum power. For example, 5 W may be subtracted from the maximum power when the weight of the user is 40 kg, and 10 W may be subtracted from the maximum power when the weight of the user is 50 kg.

Thus, according to an example embodiment of the present disclosure, when the user is riding on the trailer 230 fastened to the base frame 210, the maximum power to be transmitted to the upper module 220 may be subtracted and transmitted, thereby resolving the issue associated with a travel distance of the personal mobility device 200 being shortened.

When the switch 111 is turned on, the communication unit 116 may transmit an identification information request to the wireless power reception apparatus 120 and may receive identification information from the wireless power reception apparatus 120. The received identification information may be transmitted to the above-described identification unit 115a, and the identification unit 115a may identify, based on the identification information, the upper module 220 coupled to the base frame 210.

The above-described communication unit 116 may transmit and receive the identification information from and to the wireless power reception apparatus 120 to be described below using an in-band or out-of-band communication method.

The wireless power reception apparatus 120 may include a power receiver 124, a controller 125, and a communication unit 126. The load 222 illustrated in FIG. 1 may be included in the upper module 220. The load 222 may include, for example, various things necessary for the upper module 220, such as a mobile phone charging module, a horn, and a stationary fan in addition to a brake light, as illustrated in FIG. 2.

The power receiver 124 may include the reception resonance coil 124a magnetically coupled to the transmission resonance coil 114c to wirelessly receive power by an AC voltage, a rectification unit 124c rectifying the power wirelessly received by the reception resonance coil 124a into a DC voltage, and a DC-DC converter 124d converting the DC voltage rectified by the rectification unit 124c into a DC voltage having a magnitude required by the load 222. In some example embodiments, the power receiver 124 may also include a matching network 124b for impedance matching.

The controller 125 may receive the identification information request via the communication unit 126 and may transmit the identification information of the upper module to the wireless power transmission apparatus 110.

When the identification information request is received from the wireless power transmission apparatus 110, the communication unit 126 may transmit the identification information request to the controller 125 and may transmit the identification information to the wireless power transmission apparatus 110 under the control of the controller 125.

As described above, according to an example embodiment of the present disclosure, power may be wirelessly transmitted to an upper module coupled to a base frame, such that the upper module may also use the power of the base frame without any manipulation. A power cable may not be required, such that the upper module may be easily attached to or detached from the base frame.

In addition, according to an example embodiment of the present disclosure, a maximum power transmitted to the upper module may be set depending on the upper module, thereby optimizing a travel distance per charge of a personal mobility device.

In addition, according to an example embodiment of the present disclosure, when a user is riding on a trailer fastened to the base frame, a maximum power to be transmitted to the upper module may be subtracted and transmitted, thereby resolving the issue associated with a travel distance of the personal mobility device being shortened.

Figure 3:
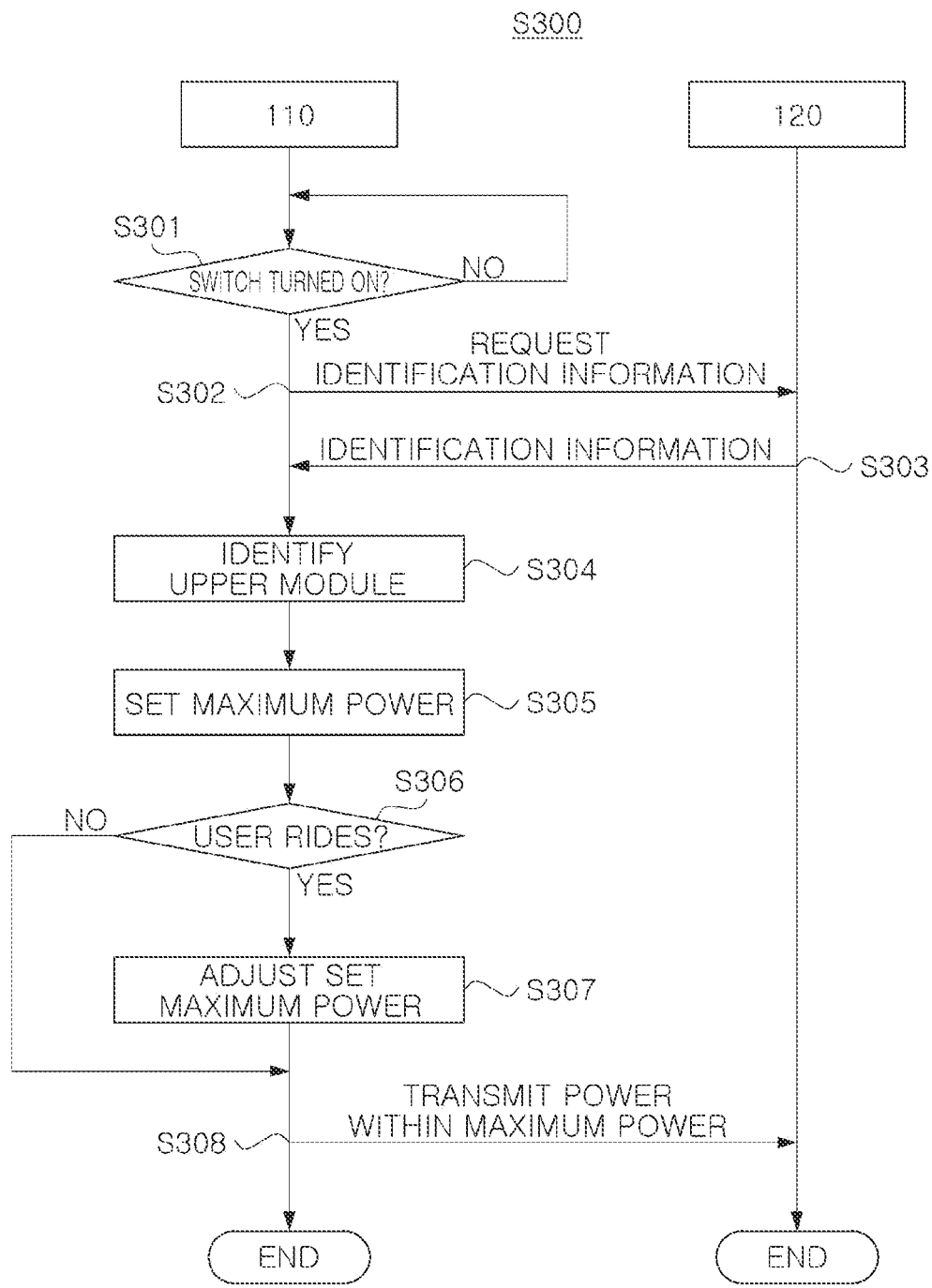
FIG. 3 is a flowchart illustrating a method for wirelessly transmitting and receiving power for a personal mobility device having a replaceable module according to an example embodiment of the present disclosure.

FIG. 3 is a flowchart illustrating a method for wirelessly transmitting and receiving power for a personal mobility device having a replaceable module according to an example embodiment of the present disclosure.

Hereinafter, a wireless power transmission/reception method (S300) for a personal mobility device having a replaceable module according to an example embodiment of the present disclosure will be described with reference to FIGS. 1 to 3. However, descriptions overlapping those of FIGS. 1 and 2 are omitted for simplicity of the disclosure.

Referring to FIGS. 1 to 3, the wireless power transmission/reception method (S300) for a personal mobility device having a replaceable module according to an example embodiment of the present disclosure may be started by determining, by the controller 115 of the wireless power transmission apparatus 110, whether the switch 111 included in the base frame 210 is turned on (S301).

When the switch 111 is turned on, the controller 115 may transmit an identification information request to the wireless power reception apparatus 120 via the communication unit 116 (S302) and may then receive identification information from the wireless power reception apparatus 120 (S303).

Subsequently, the controller 115 may identify, based on the received identification information, an upper module coupled to the base frame 210 (S304).

Subsequently, the controller 115 may set a maximum power to be wirelessly transmitted to the identified upper module (S305).

Here, the maximum power may be set depending on the upper module, and the maximum power of the upper module may be proportional to a total power of a load used in the upper module.

Subsequently, the controller 115 may determine whether the user is riding on the trailer 230 (S306). As a result of the determination in operation S306, when the user does not ride on the trailer 230, the power transmitter 114 may wirelessly transmit, to the identified upper module, power stored in the battery 113 within the set maximum power (S308).

Here, the controller 115 may determine, based on at least one of a weight measured by the weight measurement sensor 231 and an output of the driving motor 212, whether the user is riding on the trailer 230, as described above.

As a result of the determination in operation S306, when the user is riding on the trailer 230, the controller 115 may adjust the maximum power set above (S307).

Here, when it is determined that the user is riding on the trailer 230, the controller 115 may subtract a power having a predetermined magnitude from the maximum power set above.

Alternatively, as described above, when it is determined that the user is riding on the trailer 230, the controller 115 may subtract power associated with the weight of the user from the maximum power.

Finally, the power transmitter 114 may wirelessly transmit the power stored in the battery 113 to the upper module within the set maximum power (S308).

As described above, according to an example embodiment of the present disclosure, power may be wirelessly transmitted to an upper module coupled to a base frame, such that the upper module may also use the power of the base frame without any manipulation. A power cable may not be required, such that the upper module may be easily attached to or detached from the base frame.

In addition, according to an example embodiment of the present disclosure, a maximum power transmitted to the upper module may be set depending on the upper module, thereby optimizing a travel distance per charge of a personal mobility device.

In addition, according to an example embodiment of the present disclosure, when a user is riding on a trailer fastened to the base frame, a maximum power to be transmitted to the upper module may be subtracted and transmitted, thereby resolving the issue associated with a travel distance of the personal mobility device being shortened.

Figure 4:
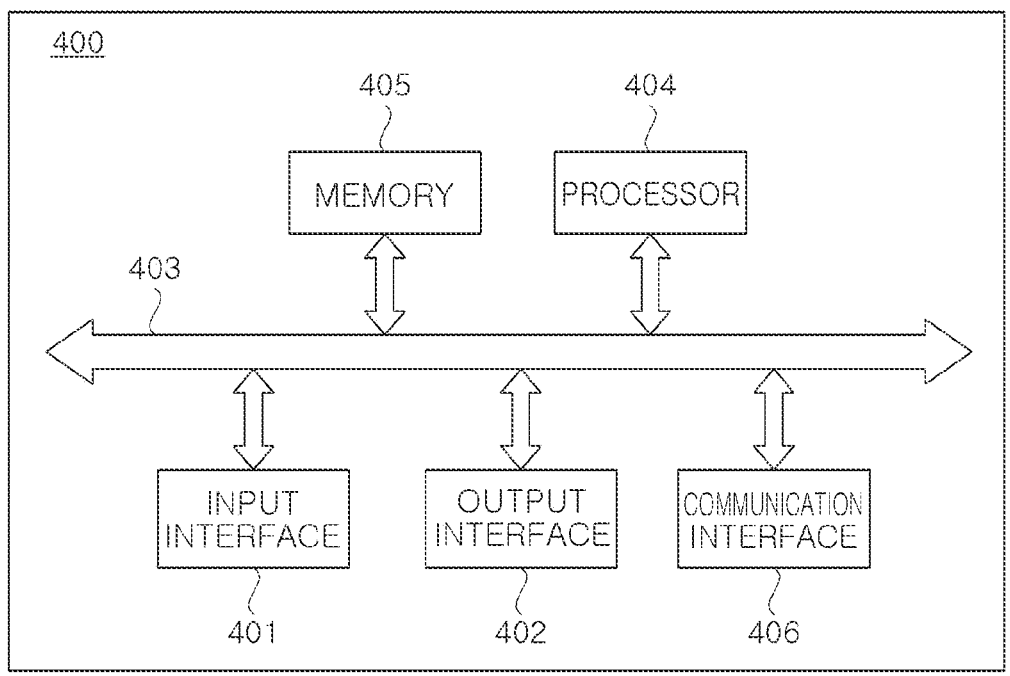
FIG. 4 is a block diagram illustrating a computer device capable of implementing, in whole or in part, a device for transmitting/receiving wireless power for a personal mobility device having a replaceable module according to an example embodiment of the present disclosure.

FIG. 4 is a block diagram illustrating a computer device capable of implementing, in whole or in part, a device for transmitting/receiving wireless power for a personal mobility device having a replaceable module according to an example embodiment of the present disclosure and may be applied to the wireless power transmission/reception apparatus 100 illustrated in FIG. 1.

As illustrated in FIG. 4, a computer device 400 may include an input interface 401, an output interface 402, a processor 404, a memory 405, and a communication interface 406, and the input interface 401, the output interface 402, the processor 404, the memory 405, and the communication interface 406 may be interconnected via a system bus 403.

The communication interface 406 may be connected to a network via wireless or wired communication, and thus may communicate with an external device. The wireless communication may include, for example, cellular communication using at least one of LTE, LTE advance (LTE-A), code division multiple access (CDMA), wideband CDMA (WCDMA), a universal mobile telecommunications system (UMTS), wireless broadband (WiBro), or a global system for mobile communications (GSM). According to an example embodiment, the wireless communication may include, for example, at least one of wireless fidelity (WiFi), Bluetooth, Bluetooth low energy (BLE), Zigbee, near field communication (NFC), magnetic secure transmission, radio frequency (RF), or a body area network (BAN). According to an example embodiment, the wireless communication may include GNSS. The GNSS may be, for example, a global positioning system (GPS), a global navigation satellite system (Glonass), a Beidou navigation satellite system (hereinafter "Beidou") or Galileo, the European global satellite-based navigation system. The wired communication may include, for example, at least one of a universal serial bus (USB), a high-definition multimedia interface (HDMI), recommended standard 232 (RS-232), power line communication, or a plain old telephone service (POTS). The network may include at least one of a telecommunications network, for example, a computer network (for example, LAN or WAN), the Internet, or a cellular network.

In an example embodiment of the present disclosure, the memory 405 is used to store programs, instructions, or codes, and the processor 404 executes the programs, instructions, or codes stored in the memory 405, controls the input interface to receive signals, and controls the output interface 402 to transmit signals. The aforementioned memory 405 may include read-only memory and random access memory and may provide instructions and data to the processor 404. The communication interface 406 may implement the communication units 116 and 126.

In an example embodiment of the present disclosure, the processor 404 may be a central processing unit (CPU) and may be understood as being another general-purpose processor, a digital signal processor (DSP), an application specific integrated circuit (ASIC), a field programmable gate array (FPGA) or another programmable logic device, an individual gate or transistor logic device, an individual hardware component, or the like. A general-purpose processor may be a microprocessor, or the processor may be any processor according to the related art or the like. The processor 404 described above may perform an operation of an apparatus for wirelessly transmitting and receiving power for a personal mobility device.

In an implementation process, the method of FIG. 3 may be accomplished by an integrated logic circuit of hardware in the processor 404 or an instruction in the form of software. The method disclosed with respect to example embodiments of the present disclosure may be performed and completed by a hardware processor or may be performed and completed by a combination of hardware in the processor and a software module. The software module may be disposed in a storage medium such as random access memory, flash memory, read-only memory, programmable read-only memory, or electrically erasable programmable memory, a register, or the like. The storage medium may be positioned in the memory 405. The processor 404 may read information in the memory 405 and may implement the above-described method in combination with hardware. In order to avoid redundancy, a detailed description will be omitted herein.

In the present disclosure, " . . . unit" may be implemented in various manners, for example, by a processor, program instructions executed by the processor, a software module, a microcode, a computer program product, a logic circuit, an application-specific integrated circuit, firmware, or the like, or may be implemented by hardware.

While embodiments of the present disclosure have been illustrated and described above, it will be apparent to those skilled in the art that modifications and variations could be made without departing from the scope of the present disclosure as defined by the appended claims.

What is claimed is:

1. An apparatus for wirelessly transmitting and receiving power for a personal mobility device having a replaceable module, the apparatus comprising:
   a power transmitter;
   a processor; and
   a non-transitory computer-readable storage medium having recorded thereon one or more programs executable by the processor, wherein the one or more programs include instructions for:
      identifying an upper module coupled to a base frame; and
      setting a maximum power to be wirelessly transmitted to the identified upper module, wherein the maximum power is set depending on the upper module,
   wherein the power transmitter is configured to wirelessly transmit power to the identified upper module within the set maximum power,
   wherein the upper module is attachable to or detachable from the base frame,
   wherein the base frame comprises a driving wheel, a driving motor configured to drive the driving wheel, a battery and the power transmitter configured to wirelessly transmit the power stored in the battery, and
   wherein the upper module comprises power receiver configured to receive the wirelessly transmitted power.

2. The apparatus of claim 1, wherein the maximum power is set in proportion to a total power of a load used in the upper module.

3. The apparatus of claim 1, wherein the base frame is further couplable to a trailer having an upper portion on which a user can ride, the trailer comprising a weight measurement sensor configured to measure a weight of the user.

4. The apparatus of claim 3, wherein a power setting unit is configured to:
   determine whether the user is riding on the trailer; and
   adjust the set maximum power in response to a determination that the user is riding on the trailer.

5. The apparatus of claim 4, wherein the power setting unit is configured to determine whether the user is riding on the trailer based on the weight measured by the weight measurement sensor or an output of the driving motor.

6. The apparatus of claim 4, wherein the power setting unit is configured to subtract a power having a preset magnitude from the maximum power in response to the determination that the user is riding on the trailer.

7. The apparatus of claim 4, wherein the power setting unit is configured to subtract a power associated with the weight of the user from the maximum power in response to the determination that the user is riding on the trailer.

8. The apparatus of claim 1, wherein:
   the power transmitter comprises a DC-AC converter configured to convert a DC voltage stored in the battery into an AC voltage and a transmission resonance coil configured to wirelessly transmit power by the converted AC voltage using a preset wireless power transmission method; and
   the power receiver comprises a reception resonance coil magnetically coupled to the transmission resonance coil, the reception resonance coil configured to wirelessly receive the power by the AC voltage, a rectifier configured to rectify the power wirelessly received via the reception resonance coil into a DC voltage, and a DC-DC converter configured to convert the DC voltage rectified by the rectifier into a DC voltage having a magnitude required by a load.

9. The apparatus of claim 8, wherein the preset wireless power transmission method comprises a magnetic induction method or a magnetic resonance method.

10. The apparatus of claim 8, wherein:
    the transmission resonance coil is attached to an upper surface of the base frame and the reception resonance coil is attached to a lower surface of the upper module;
    the transmission resonance coil and the reception resonance coil are spaced apart from each other by a predetermined interval in a state in which the upper module is coupled to the base frame; and
    a central portion of the transmission resonance coil and a central portion of the reception resonance coil are aligned with each other in an upward direction in the state in which the upper module is coupled to the base frame.

11. The apparatus of claim 1, further comprising a communication unit configured to request identification information and receive the identification information in response to the request in response to a determination that a switch is turned on, wherein an identification unit is configured to identify the upper module coupled to the base frame based on the received identification information.

12. The apparatus of claim 1, wherein the upper module comprises an upper frame of a stroller, an electric car for children, or a wagon for children.

13. A method for wirelessly transmitting and receiving power for a personal mobility device having a replaceable module, the method comprising:
- identifying an upper module coupled to a base frame;
- setting a maximum power to be wirelessly transmitted to the identified upper module, wherein the maximum power is set depending on the upper module; and
- wirelessly transmitting power to the identified upper module within the set maximum power,
- wherein the upper module is attachable to or detachable from the base frame,
- wherein the base frame comprises a driving wheel, a driving motor configured to drive the driving wheel, a battery, and a power transmitter configured to wirelessly transmit the power stored in the battery, and
- wherein the upper module comprises a power receiver configured to receive the power wirelessly transmitted from the power transmitter.

14. The method of claim 13, wherein the base frame is further couplable to a trailer having an upper portion on which a user can ride, the trailer comprising a weight measurement sensor configured to measure a weight of the user.

15. The method of claim 14, further comprising:
- determining whether the user is riding on the trailer; and
- adjusting the set maximum power in response to a determination that the user is riding on the trailer.

16. The method of claim 15, wherein determining whether the user is riding on the trailer is based on the weight measured by the weight measurement sensor or an output of the driving motor.

17. The method of claim 15, wherein adjusting the set maximum power comprises subtracting a power having a preset magnitude from the maximum power in response to the determination that the user is riding on the trailer.

18. A non-transitory computer-readable storage medium recording a program for executing the method of claim 13 on a computer.

19. The method of claim 13, wherein identifying the upper module comprises identifying the upper module among at least 3 upper modules.

20. The method of claim 19, wherein each of the at least 3 upper modules comprises a maximum power level selected from a power level of between 10 W and 120 W, inclusive.

* * * * *